United States Patent [19]

Leibhard

[11] Patent Number: 5,607,005
[45] Date of Patent: Mar. 4, 1997

[54] METHOD OF FASTENING AN ATTACHMENT MEMBER IN A WOODEN COMPONENT

[75] Inventor: Erich Leibhard, Munich, Germany

[73] Assignee: Hilti Aktiengesellschaft, Furstentum, Liechtenstein

[21] Appl. No.: 489,417

[22] Filed: Jun. 12, 1995

[30] Foreign Application Priority Data

Jun. 10, 1994 [DE] Germany ............................ 44 20 267.9

[51] Int. Cl.$^6$ ...................................................... B27F 7/00
[52] U.S. Cl. ........................... 144/353; 144/329; 144/345; 29/458; 156/513
[58] Field of Search .................................. 29/458, 525.1; 156/256, 513; 144/329, 345, 353

[56] References Cited

U.S. PATENT DOCUMENTS

| | | | |
|---|---|---|---|
| 4,190,479 | 2/1980 | Smith | 29/458 |
| 4,400,863 | 8/1983 | Schroeder | 29/458 |
| 4,420,358 | 12/1983 | Kindt et al. | 144/353 |
| 4,589,187 | 5/1986 | Stone et al. | 29/458 |
| 4,674,257 | 6/1987 | Rose | 144/353 |
| 4,834,153 | 5/1989 | Stegherr | 144/353 |
| 5,473,806 | 12/1995 | Krug et al. | 29/458 |

*Primary Examiner*—W. Donald Bray
*Attorney, Agent, or Firm*—Anderson Kill & Olick P.C.

[57] ABSTRACT

In a method of fastening an attachment member (1) in a prefabricated borehole (2) in a wooden component (B), the inside surface of the borehole is provided with a profiled surface (2a) by a threadformer (4) which compacts the inside surface of the borehole (2). The borehole (2) is filled with a hardenable mass before the attachment member is inserted into the borehole.

5 Claims, 2 Drawing Sheets

METHOD OF FASTENING AN ATTACHMENT MEMBER IN A WOODEN COMPONENT

BACKGROUND OF THE INVENTION

The present invention is directed to a method of fastening an attachment member with a profiled surface in a prefabricated borehole in a wooden component by means of a hardenable mass supplied to the borehole before inserting the attachment member. The largest outside diameter of the attachment member extending perpendicularly to its axial direction is smaller in the region of its profiled surface than the smallest diameter of the borehole.

A known method of fastening the attachment member in a borehole in a component is disclosed in DE-OS 2 728 742. Both the profiled surface and an endface of the attachment member is coated with a pre-accelerated synthetic resin and the coated attachment member is subsequently rolled across a mixture of a granular filler and a hardener forming a sheathing where the grains of the filler adhere in the outside region only on their side facing the attachment member. Subsequently, the coated attachment member is pushed into the base of a prefabricated borehole as it is turned several times about its axis. The diameter of the borehole is slightly larger than the outside diameter of the attachment member in the region of its profiled surface.

After an adequate period of hardening, the attachment member is solidly connected to the component by the hardened mixture.

The contact surface of the borehole is smaller than the contact surface of the profiled attachment member. Therefore, most of the damage occurs between the hardened mixture and the wall of the borehole if tensile forces are transmitted to the attachment member.

SUMMARY OF THE INVENTION

Therefore, the primary object of the present invention is to provide a method of fastening an attachment member having a profiled surface in a borehole of a wooden component where tensile forces developed in the attachment member are securely carried by the component without a premature failure in the attachment region.

In accordance with the present invention, the wall of the borehole is provided with a profiled surface by means of a tool, prior to introducing the hardenable mass into the borehole, where the profiled surface is compacted by the tool.

The wall of the borehole is provided with a larger contact surface by the method of the present invention. In addition, a positively locked connection is afforded between the hardened mass and the wall of the borehole due to the profiled surface.

Preferably, the profiling is in the form of a thread for easier fabrication.

A tool in the form of an insertable threadformer is appropriate for producing such a thread profile. Contrary to a tap, the threadformer has no cutting edges. When the threadformer is screwed into the prefabricated borehole, its teeth dig into the wall of the borehole, whereby material compaction or densification of the component occurs in the region of the borehole and quantity-wise corresponds to the volume of the teeth of the threadformer. At the same time, the profiling of the wall of the borehole is formed, and increased surface resistance in the component is achieved. This increased surface resistance results in an additional increase in the extraction values in the axial direction, after an attachment member, along with the hardenable mass, has been inserted.

To obtain a good distribution of the hardenable mass within the borehole, when the attachment member is inserted into the borehole at least partially filled with hardenable mass, the outside diameter of the attachment member in the region of the profiled surface has a specific dimensional relation relative to the diameter of the borehole. Accordingly, the diameter of the borehole corresponds to 1.4 to two times the outside diameter of the attachment member.

For reasons of cost, an attachment member employed in the inventive method is preferably a threaded rod.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
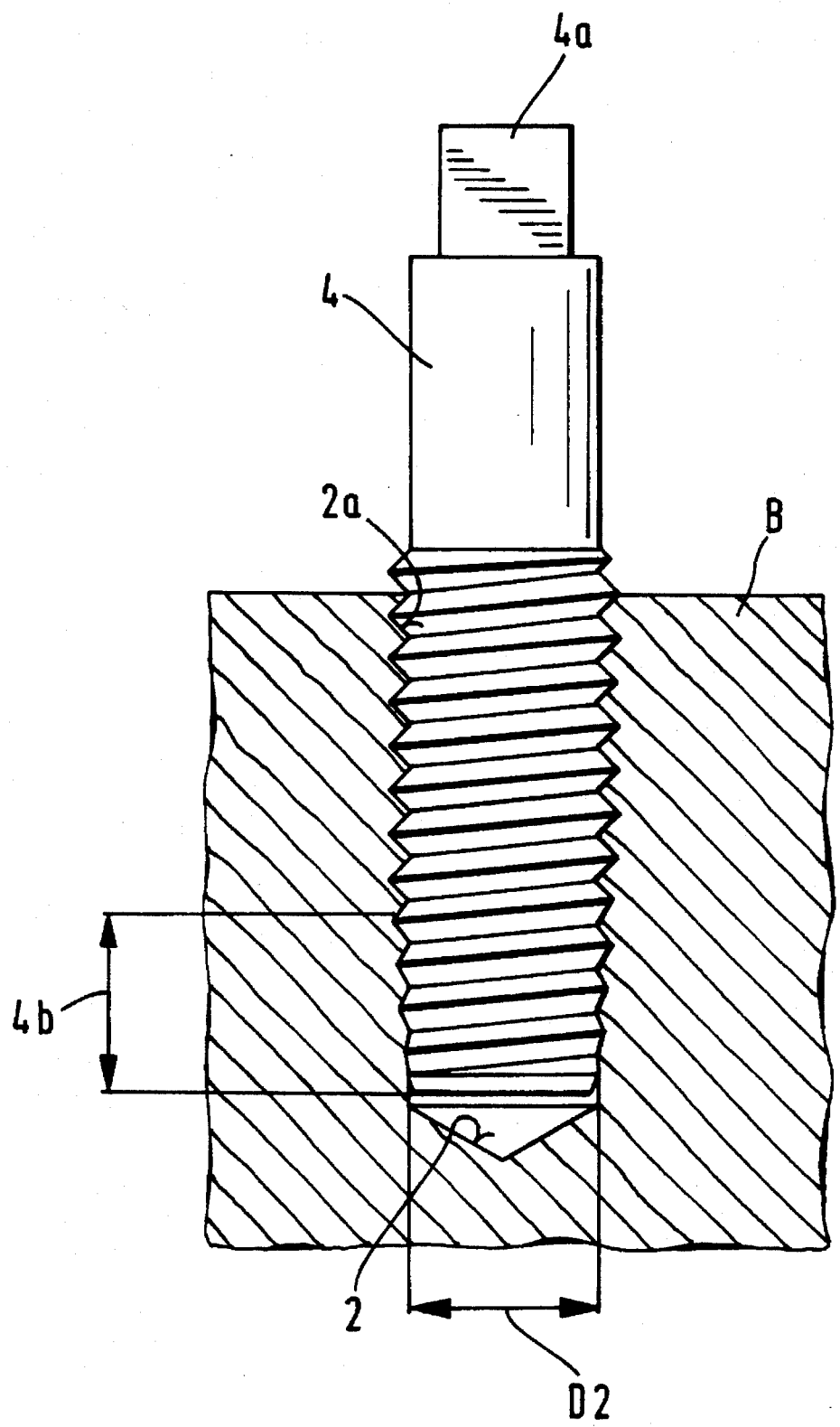
FIG. 1 is an elevational view illustrating the formation of a profiling in a prefabricated borehole.

In the method step illustrated in FIG. 1, a profiled surface $2a$ is formed in the wall of the borehole 2 by a tool in the form of a threadformer 4. In forming the profiled surface $2a$, the material of the component B in the region of the profiled surface is radially compacted and quantity-wise corresponds to the volume of the teeth of the threadformer 4.

At its end projecting out of the borehole, the threadformer has an engagement part $4a$ on which a suitable tool can be placed in rotationally locked connection for turning the threadformer 4 about its axial direction.

The diameter of the borehole corresponds essentially to the root diameter of the thread profile of the threadformer 4.

At its leading end, the threadformer 4 has a taper $4b$ for the improved centering of the threadformer as it is screwed into the borehole. After producing the profiled surface $2a$ in the wall of the borehole, the threadformer is screwed out of the borehole.

Figure 2:
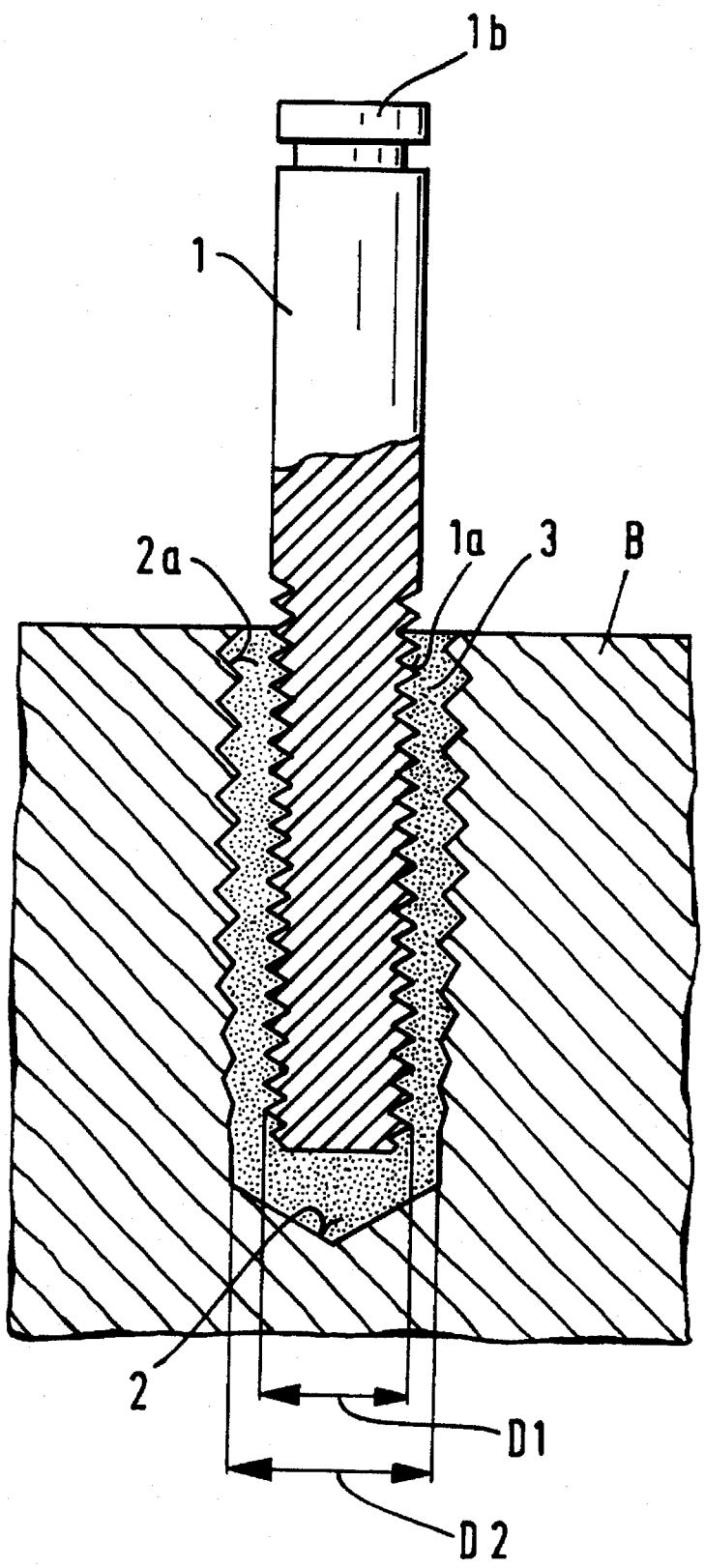
FIG. 2 is an elevational view, partly in section, of an attachment member secured in the borehole shown in FIG. 1 by means of a hardenable mass.

As indicated in FIG. 2, initially the borehole is at least partially filled with a hardenable mass 3 before the attachment member 1 is inserted. Upon insertion of the attachment member, the hardenable mass is distributed in the borehole 2 around the attachment member 1.

The largest diameter D1 in the region of the profiled surface $1a$ extending perpendicularly to the axis of the attachment member is dimensioned to be smaller than the smallest diameter D2 of the borehole 2. The diameter D2 is in the range of 1.4 to two times the outside diameter of the region of the attachment member provided with the profiled surface $1a$.

The attachment member 1 has a load engagement part 1*b* at its trailing end region, that is, the end extending out of the borehole, and spaced axially from the profiled surface 1*a*.

While specific embodiments of the invention have been shown and described in detail to illustrate the inventive principles, it will be understood that the invention may be embodied otherwise without departing from such principles.

I claim:

1. Method of fastening an axially extending attachment member (1) having an axially extending first profiled surface (1*a*) in a prefabricated axially extending borehole (2) having an inside surface in a wooden component, using a hardenable mass (3) for fastening the attachment member, and introducing the hardenable mass into the borehole (2) before inserting the attachment member (1), providing the attachment member (1) with a maximum outside diameter (D1) smaller than a minimum diameter (D2) of the borehole, wherein the improvement comprises before introducing the hardenable mass, forming an axially extending second profiled surface (2*a*) in the inside surface of the borehole (2) using a profiling tool and compacting the inside surface of the borehole by means of the profiling tool.

2. Method, as set forth in claim 1, wherein the second profiled surface (2*a*) is a threaded profiled surface.

3. Method, as set forth in claim 2, wherein the profiling tool for forming the threaded profiled surface (2*a*) in the borehole (2) is a threadformer (4) capable of being screwed into the component.

4. Method, as set forth in any one of claims 1–3, wherein the minimum diameter (D2) of the borehole (2) is in the range of 1.4 to two times the outside diameter (D1) of the axial region of the attachment member (1) having the first profiled surface (1*a*).

5. Method, as set forth in any one of claims 1–3, wherein the attachment member (1) is a threaded rod.

* * * * *